US011288348B2

(12) United States Patent
Fu et al.

(10) Patent No.: US 11,288,348 B2
(45) Date of Patent: Mar. 29, 2022

(54) BIOMETRIC AUTHENTICATION, IDENTIFICATION AND DETECTION METHOD AND DEVICE FOR MOBILE TERMINAL AND EQUIPMENT

(71) Applicant: ADVANCED NEW TECHNOLOGIES CO., LTD., Grand Cayman (KY)

(72) Inventors: Xinyi Fu, Hangzhou (CN); Zhe Li, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 16/812,163

(22) Filed: Mar. 6, 2020

(65) Prior Publication Data

US 2020/0210561 A1 Jul. 2, 2020

Related U.S. Application Data

(63) Continuation of application No. PCT/CN2018/104480, filed on Sep. 7, 2018.

(30) Foreign Application Priority Data

Dec. 15, 2017 (CN) ........................ 201711353642.X

(51) Int. Cl.
*G06F 21/32* (2013.01)
*G06N 20/00* (2019.01)
(Continued)

(52) U.S. Cl.
CPC ............ *G06F 21/32* (2013.01); *G06F 3/0346* (2013.01); *G06F 17/18* (2013.01); *G06F 21/75* (2013.01); *G06N 20/00* (2019.01)

(58) Field of Classification Search
CPC ........ G06F 21/31; G06F 21/316; G06F 21/32; G06F 21/52; G06F 21/55; G06F 21/554;
(Continued)

(56) References Cited

U.S. PATENT DOCUMENTS 10,075,846 B1 * 9/2018 Acar .................. H04L 63/0861
2009/0199296 A1 * 8/2009 Xie ...................... G06F 21/552 726/23

(Continued)

FOREIGN PATENT DOCUMENTS

CA 2902093 A1 2/2016
CN 103595538 A 2/2014

(Continued)

OTHER PUBLICATIONS

International Search Report and Written Opinion for Application No. PCT/CN2018/104480, dated Dec. 3, 2018, 11 pages.

(Continued)

*Primary Examiner* — Ayoub Alata

(57) ABSTRACT

The application provides a method for attack detection in biometric authentication. The method may be implemented by a mobile terminal device, and comprises: obtaining sensor data of the mobile terminal device, wherein the sensor data is collected when the mobile terminal device performs biometric authentication, and the sensor data comprises acceleration sensor data of the mobile terminal device indicating accelerations of the mobile terminal device in x, y, and z axes of a three-dimensional space, and/or gyroscope data of the mobile terminal device indicating angular velocities in the x, y, and z axes of the three-dimensional space; and inputting the sensor data into an attack determination model to determine whether an attack occurs in the biometric authentication, wherein the attack determination model is trained by using sensor training data obtained based on sensor data of the mobile terminal device collected when the (Continued)

mobile terminal device performed biometric authentication historically.

20 Claims, 2 Drawing Sheets

(51) Int. Cl.
*G06F 3/0346* (2013.01)
*G06F 17/18* (2006.01)
*G06F 21/75* (2013.01)

(58) Field of Classification Search
CPC ... G06F 21/75; G06F 3/00; G06F 3/03; G06F 3/033; G06F 3/0346; G06F 17/10; G06F 17/15; G06F 17/153; G06F 17/18; G06N 20/00; G06N 20/10; G06N 20/20
See application file for complete search history.

(56) References Cited

U.S. PATENT DOCUMENTS

2010/0146622 A1* 6/2010 Nordstrom ............ G06F 21/316 726/23
2012/0235938 A1 9/2012 Laubach
2012/0278094 A1 11/2012 Kovacevic et al.
2013/0102283 A1 4/2013 Lau et al.
2015/0294097 A1* 10/2015 Ramachandran ..... G06F 21/316 726/28
2015/0365423 A1* 12/2015 Prokopi ................ G06F 21/316 713/152
2016/0057623 A1 2/2016 Dutt et al.
2016/0063471 A1* 3/2016 Kobres .................. G06Q 20/20 705/18
2016/0180078 A1 6/2016 Chhabra et al.
2016/0197918 A1 7/2016 Turgeman et al.
2016/0239649 A1* 8/2016 Zhao ..................... G06F 21/316
2016/0259924 A1 9/2016 Dutt et al.
2016/0321445 A1 11/2016 Furgeman et al.
2017/0032114 A1 2/2017 Turgeman
2017/0140279 A1* 5/2017 Turgeman ............. G06N 20/00
2017/0161478 A1* 6/2017 Stavrou ................. G06F 21/316
2017/0169231 A1 6/2017 Chhabra et al.
2017/0227995 A1* 8/2017 Lee ......................... G06F 3/017
2018/0000367 A1 1/2018 Longinotti-Buitoni
2018/0007553 A1* 1/2018 Dutt ...................... G06F 1/1694
2018/0132104 A1 5/2018 Dhulipalla et al.
2018/0183789 A1* 6/2018 Tischart .............. H04L 63/0281
2018/0253755 A1 9/2018 Cheng et al.
2019/0108330 A1* 4/2019 Sikder ................... G06F 21/577
2019/0121956 A1 4/2019 Turgeman
2019/0141033 A1* 5/2019 Kaafar ................ H04L 63/0861
2019/0158535 A1 5/2019 Kedem et al.

FOREIGN PATENT DOCUMENTS

CN 104239416 A 12/2014
CN 104318138 A 1/2015
CN 105279411 A 1/2016
CN 105991593 A 10/2016
CN 106022834 A 10/2016
CN 106230849 A 12/2016
CN 107153780 A 9/2017
CN 107169334 A 9/2017
CN 108280332 A 7/2018
TW I604334 B 11/2017

OTHER PUBLICATIONS

First Office Action for Chinese Application No. 201711353642.X dated Feb. 23, 2020, 13 pages.
Supplemental Search or Chinese Application No. 201711353642.X dated Apr. 14, 2020, 2 pages.
Search Report for Taiwan Application No. 107135755, dated Sep. 23, 2019, 1 page.
Supplementary Search for Chinese Application No. 201711353642.X dated Jun. 16, 2020.
Search Report for European Application No. 18887829.2 dated Nov. 5, 2020.
Babins Shrestha et al., “Walk-Unlock: Zero-Interaction Authentication Protected with Multi-Modal Gait Biometrics”, Cornell University Library, May 3, 2016.

* cited by examiner

BIOMETRIC AUTHENTICATION, IDENTIFICATION AND DETECTION METHOD AND DEVICE FOR MOBILE TERMINAL AND EQUIPMENT

CROSS-REFERENCE TO RELATED APPLICATIONS

The present application is a continuation application of International Patent Application No. PCT/CN2018/104480, filed on Sep. 7, 2018, and entitled "BIOMETRIC AUTHENTICATION, IDENTIFICATION AND DETECTION METHOD AND DEVICE FOR MOBILE TERMINAL AND EQUIPMENT." The International Patent Application is based on and claims priority to the Chinese Patent Application No. 201711353642.X, filed on Dec. 15, 2017. All of the above-referenced applications are incorporated herein by reference in their entirety.

TECHNICAL FIELD

The present application relates to the field of computer software technologies, and in particular to a method, apparatus, and electronic device for attack detection in biometric authentication via a mobile terminal device.

BACKGROUND

The security of a biometric authentication system in use has always been an issue that attracts widespread attention. In a face recognition system, the most common spoofing method may be impersonation attack or reproduction attack. For example, an imposter uses a fake feature having the same expression form as the authentic feature to invade the system. The commonly used means relied upon by the impersonation attacks mainly include photos (or processed images), videos, three dimensional (3D) models, and the like.

Impersonation attacks to face recognition systems are mainly addressed by using liveness detection technologies. Existing liveness detection methods include 3D depth information analysis, detection of physiological behaviors such as blink, facial expression and speech interaction, Fourier frequency analysis, thermal infrared radiation (IR), and the like. The detection of physiological behaviors such as blink and the facial expression and speech interaction typically require a user to blink, open mouth, or read a randomly generated speech. These liveness detection methods are effective, but highly depend on the cooperation of users.

SUMMARY

The embodiments of the specification provide a method, apparatus, and electronic device for attack detection in biometric authentication via a mobile terminal device, which can reduce or eliminate the dependence on user cooperation to achieve the effect of strengthening the security of biometric authentication. Biometric authentication refers to using biological characteristics or related information to authenticate, verify, or identify a user. The embodiments of the specification provide better security support for users while enhancing user experience.

According to one aspect, the specification provides a method for attack detection in biometric authentication. The method may be implemented by a mobile terminal device, and comprise: obtaining sensor data of the mobile terminal device, wherein the sensor data is collected when the mobile terminal device performs biometric authentication, and the sensor data comprises acceleration sensor data of the mobile terminal device indicating accelerations of the mobile terminal device in x, y, and z axes of a three-dimensional space, and/or gyroscope data of the mobile terminal device indicating angular velocities in the x, y, and z axes of the three-dimensional space; and inputting the sensor data into an attack determination model to determine whether an attack occurs in the biometric authentication, wherein the attack determination model is trained by using sensor training data obtained based on sensor data of the mobile terminal device collected when the mobile terminal device performed biometric authentication historically.

In some embodiments, the method may further comprise: obtaining a risk level of a user corresponding to the mobile terminal device; and inputting the sensor data into an attack determination model to determine whether an attack occurs in the biometric authentication may comprise: inputting the sensor data and the risk level of the user corresponding to the mobile terminal device into the attack determination model to determine whether an attack occurs in the biometric authentication, wherein the attack determination model is trained by using sensor training data corresponding to the risk level of the user corresponding to the mobile terminal device.

In some embodiments, the attack determination model may include a determination threshold, and the determination threshold may be set based on the risk level of the user corresponding to the mobile terminal device.

In some embodiments, the method may further comprise: obtaining information of a model of the mobile terminal device; and inputting the sensor data into an attack determination model to determine whether an attack occurs in the biometric authentication may comprise: inputting the sensor data and the information of the model of the mobile terminal device into the attack determination model to determine whether an attack occurs in the biometric authentication, wherein the attack determination model is trained by using sensor training data corresponding to the model of the mobile terminal device.

In some embodiments, before inputting the sensor data into an attack determination model to determine whether an attack occurs in the biometric authentication, the method may further comprise: pre-processing the sensor data by performing at least one of the following operations on the sensor data: filtering operation, boundary detection operation, or length normalization operation, to obtain pre-processed sensor data; and inputting the sensor data into an attack determination model to determine whether an attack occurs in the biometric authentication may comprise: inputting the pre-processed sensor data into the attack determination model to determine whether an attack occurs in the biometric authentication, wherein the attack determination model is trained by using pre-processed sensor training data which is obtained by pre-processing the sensor training data.

In some embodiments, before inputting the sensor data into an attack determination model to determine whether an attack occurs in the biometric authentication, the method may further comprise: performing feature extraction on the sensor data to obtain the sensor data with features extracted; and inputting the sensor data into an attack determination model to determine whether an attack occurs in the biometric authentication may comprise: inputting the sensor data with features extracted into the attack determination model to determine whether an attack occurs in the biometric authentication, wherein the attack determination model is trained by using sensor training data with features extracted which is obtained by performing feature extraction on the sensor training data.

In some embodiments, the acceleration sensor data of the mobile terminal device may be measured by an acceleration sensor of the mobile terminal device, and the gyroscope data may be measured by a gyroscope of the mobile terminal device; and the sensor data with features extracted may comprise: an average, a standard deviation, a median, a maximum, a minimum, and/or an integral of measurements of the acceleration sensor of the mobile terminal device in the x, y, and z axes of the three-dimensional space; and/or an average, a standard deviation, a median, a maximum, a minimum, and/or an integral of measurements of the gyroscope of the mobile terminal device in the x, y, and z axes of the three-dimensional space.

In some embodiments, the sensor data with features extracted may also comprise a time length of performing the biometric authentication.

In some embodiments, the method may further comprise: adjusting a security authentication level of the biometric authentication based on an output result of the attack determination model, wherein the higher a probability of attack occurrence is indicated by the output result, the higher the security authentication level of the biometric authentication may become after the adjustment.

According to another aspect, the specification provides an apparatus for attack detection in biometric authentication. The apparatus may comprise one or more processors and one or more non-transitory computer-readable memories coupled to the one or more processors and configured with instructions executable by the one or more processors to cause the apparatus to perform operations comprising: obtaining sensor data of the mobile terminal device, wherein the sensor data is collected when the mobile terminal device performs biometric authentication, and the sensor data comprises acceleration sensor data of the mobile terminal device indicating accelerations of the mobile terminal device in x, y, and z axes of a three-dimensional space, and/or gyroscope data of the mobile terminal device indicating angular velocities in the x, y, and z axes of the three-dimensional space; and inputting the sensor data into an attack determination model to determine whether an attack occurs in the biometric authentication, wherein the attack determination model is trained by using sensor training data obtained based on sensor data of the mobile terminal device collected when the mobile terminal device performed biometric authentication historically.

According to still another aspect, the specification provides a non-transitory computer-readable storage medium configured with instructions executable by one or more processors to cause the one or more processors to perform operations comprising: obtaining sensor data of the mobile terminal device, wherein the sensor data is collected when the mobile terminal device performs biometric authentication, and the sensor data comprises acceleration sensor data of the mobile terminal device indicating accelerations of the mobile terminal device in x, y, and z axes of a three-dimensional space, and/or gyroscope data of the mobile terminal device indicating angular velocities in the x, y, and z axes of the three-dimensional space; and inputting the sensor data into an attack determination model to determine whether an attack occurs in the biometric authentication, wherein the attack determination model is trained by using sensor training data obtained based on sensor data of the mobile terminal device collected when the mobile terminal device performed biometric authentication historically.

The embodiments of the specification can achieve at least one of the following technical effects. Sensor data collected by a mobile terminal device during biometric authentication is obtained, and attack detection is performed based on the sensor data by using a sensor classification model. As a result, with reduced dependence or without dependence on user cooperation, the effect of strengthening the security of biometric authentication can be achieved. The embodiments of the specification provide better security support for users while enhancing user experience.

BRIEF DESCRIPTION OF THE DRAWINGS

To more clearly describe the embodiments of the specification, the accompanying drawings to be used in the description of the embodiments will be briefly described below. The accompanying drawings in the description below are merely some of the embodiments of the specification. Other drawings may be obtained by one of ordinary skill in the art without creative effort according to these accompanying drawings.

DETAILED DESCRIPTION

To enable those skilled in the art to better understand the specification, the embodiments of the specification will be described in detail below with reference to the accompanying drawings. The described embodiments are merely some, but not all, embodiments of the specification. All other embodiments obtained, based on some embodiments of the specification, by one of ordinary skill in the art without creative effort shall fall within the protection scope of the specification.

Figure 1:
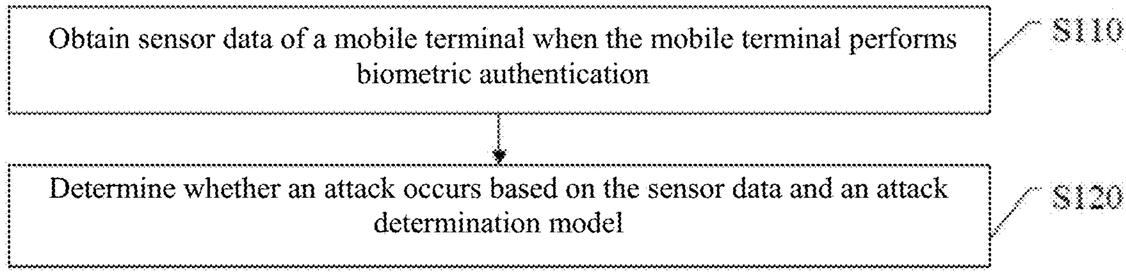
FIG. 1 is a flow chart of a method for attach detection in biometric authentication via a mobile terminal device according to some embodiments of the specification.

FIG. 1 is a flow chart of a method for attach detection in biometric authentication via a mobile terminal device according to some embodiments of the specification. The method shown in FIG. 1 may be implemented by an apparatus for attack detection in biometric authentication or an application (APP) on the mobile terminal device for attack detection in biometric authentication. For example, the method shown in FIG. 1 may be implemented by the mobile terminal device. The method for attach detection in biometric authentication via a mobile terminal device may include the following steps.

In the step S110, the method includes obtaining sensor data of a mobile terminal device when the mobile terminal device performs biometric authentication.

In the embodiments of the specification, there may be various authentication methods for biometric authentication, such as facial feature authentication, speech feature authentication, gesture input feature authentication, etc. The embodiments of the specification may be applicable to various biometric authentication, which is not limited by the specification.

In some embodiments, the time length for collecting the sensor data may be the same or different for users having different risk levels. For example, in the step S110, a desired time length for collecting the sensor data may also be determined based on a risk level of a user. A higher risk level requires a longer time length for sensor data collection. For example, the user risk levels may be divided into three types, e.g., low risk, regular risk, and high risk. For users at a low risk level, the collection time length may be set to 3 seconds; for users at a regular risk level, the collection time length may be set to 5 seconds; for users at a low risk level, the collection time length may be set to 7 seconds, and the like.

Figure 2:
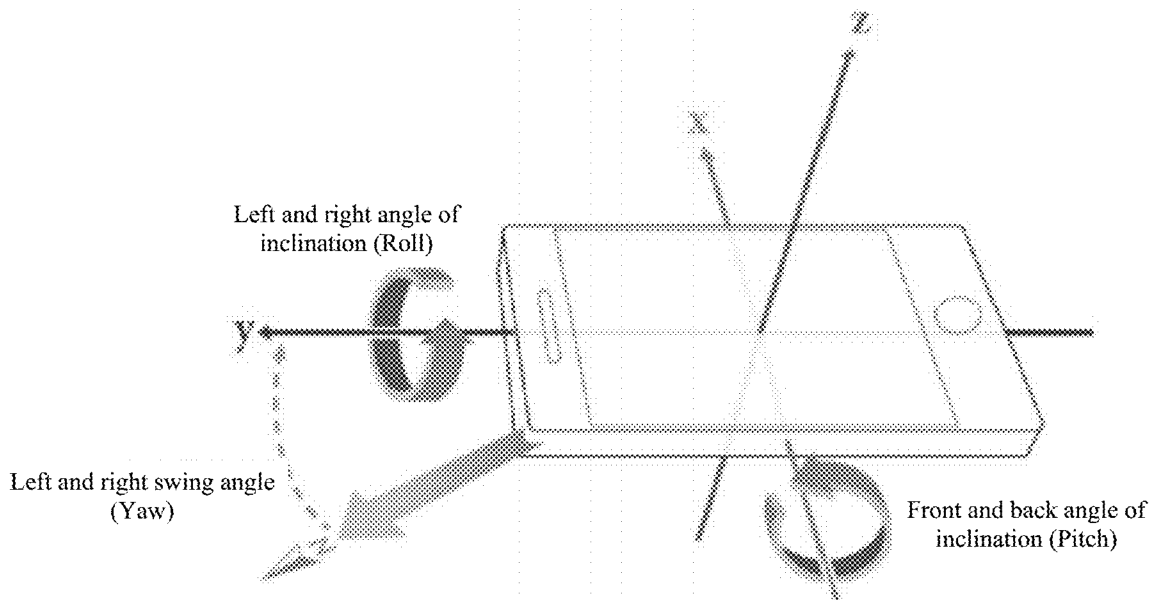
FIG. 2 is a schematic diagram of six dimensional parameters of the mobile terminal device according to some embodiments of the specification.

FIG. 2 is a schematic diagram of six dimensional parameters of the mobile terminal device according to some embodiments of the specification. In some embodiments, a three-axis gyroscope may sense comprehensive dynamic information of the mobile terminal device, including left and right angle of inclination (roll), front and back angle of inclination (pitch), and left and right swing angle (yaw), respectively; and a three-axis accelerator may sense acceleration of the mobile terminal device in three directions in a 3D space (x-axis, y-axis, and z-axis) and three directions of front and back, left and right, and up and down. The three-axis gyroscope is configured to detect angular rotation and balance, e.g., an angular velocity, of the mobile terminal device, and data measured thereby may be referred to as gyroscope data. The three-axis accelerator is configured to detect lateral acceleration, and data measured thereby may be referred to as acceleration sensor data. The three-axis gyroscope and the three-axis accelerator may be collectively referred to as a six-axis gyroscope.

In some embodiments, when the sensor data of the mobile terminal device is obtained, the gyroscope data and/or the acceleration sensor data as shown in FIG. 2 may be obtained.

In the step S120, the method may include determining whether an attack occurs based on the sensor data and an attack determination model.

In some embodiments, the attack determination model is obtained based on training with sensor training data. When the biometric authentication is performed for a user, sensor data may be different between a normal user and an imposter user. Taking face authentication as an example, if the imposter user performs authentication by a photo (or a processed image), a video, a 3D model, or other impersonation attack means, the sensor data at the time of authentication thereof is different from sensor data at the time of authentication by the normal user. On the basis of this concept, whether an attack occurs during the process of biometric authentication corresponding to the sensor data may be determined based on the sensor data and an attack determination model.

In some embodiments, to determine whether an attack occurs based on the sensor data and an attack determination model may, for example, use the sensor data as an input to the attack determination model, so as to determine whether an attack occurs, or to perform data processing on the sensor data to obtain processed sensor data, and then use the processed sensor data as an input to the attack determination model to determine whether an attack occurs.

For example, an output result of the attack determination model may be a probability that an attack occurs, a range of probabilities that an attack occurs, a risk level of attack occurrence, or straightly be whether an attack occurs. Based on the output result, it may be determined whether an attack occurs. Alternatively, based on conversion processing of the output result, it may be determined whether an attack occurs. Alternatively, based on the output result and in combination with other factors like models and rules, it may be determined whether an attack occurs. A probability segmentation of the attack determination model and risk levels of attack occurrence are listed in Table 1.

TABLE 1

| Model probability segmentation | Risk levels of attack occurrence |
|---|---|
| [0.5, 1] | Ultra-high risk |
| [0.4, 0.5] | High risk |
| [0.3, 0.4] | Medium risk |
| [0, 0.3] | Low risk |

According to practical online testing, when a determination threshold is set to 0.4 (i.e., it is determined that an attack occurs when the probability is greater than 0.4 and no attack occurs when the probability is lower than 0.4), the number of times of identifying a risk accounts for one ten-thousandth of the total number of times of invoking the attack determination model; most of the times of identifying a risk are attack attempts according to manual verification, and the number of times of misjudgment accounts for three hundred-thousandth of the total number of times of invoking the attack determination model.

In some embodiments, sensor data collected by a mobile terminal device during biometric authentication is obtained, and attack determination is performed on the sensor data based on the attack determination model such as a sensor classification model. As a result, with reduced dependence or without dependence on user cooperation, the effect of strengthening the security of biometric authentication can be achieved. The embodiments of the specification provide better security support for users while enhancing user experience.

In some embodiments, in the step S120, data processing may be performed on the sensor data, and the sensor data after the data processing may be used as an input to the attack determination model.

In some embodiments, in the step S120, the method may comprise: pre-processing the sensor data to obtain pre-processed sensor data, where pre-processing the sensor data comprises performing at least one of the following operations on the sensor data: filtering operation, boundary detection operation, and length normalization operation; and determining whether an attack occurs based on the pre-processed sensor data and the attack determination model, where the attack determination model is obtained based on training with the pre-processed sensor training data.

These three pre-processing methods will be described briefly as follows.

In some embodiments, filtering processing may be performed on the sensor data. Since noises due to shaky hands or inherent to the sensors themselves are mostly with high frequencies, filtering processing may often be performed first when the sensor data is pre-processed. In some embodiments, a low-pass filter may be used to suppress data with high frequencies. In addition, a moving average method may be adopted in the some embodiments of the specification to process the sensor data. For example, taking acceleration data on the x-axis as an example, the acceleration data may be processed using the following equation:

$$acc_x[i] = \frac{1}{M}\sum_{j=0}^{M-1} acc_x[i-j]$$

where $acc_x[i]$ represents acceleration data on the x-axis, i and i−j represent indexes of the acceleration data, and M represents the size of a moving window.

The processing of acceleration data on the x-axis may be referenced for similar processing on acceleration data on the y-axis and z-axis and gyroscope data on the x, y, and z axes, which will not be elaborated.

In addition, assuming that an output from the acceleration sensor comprises gravitational acceleration, a high-pass filter may be used to remove the gravitational impact, or a linear acceleration sensor may be used to replace the regular acceleration sensor.

The filtering processing described in the embodiments of the specification is merely an example, while other filtering processing methods are not excluded. For example, a variable sliding smoothing algorithm may be adopted for processing, etc.

In some embodiments, boundary detection processing may be performed. For example, time points at which the user starts and ends the biometric authentication may be identified by a threshold method based on an added window. One time window is used from the front and back ends of the sensor data, respectively, to explore toward the middle portion of the sensor data. If the variation of the sensor values of the sensor data in one time window exceeds a threshold, then the first frame corresponding to the time window used to explore from the front to the back is recorded as a beginning boundary, the last frame corresponding to the time window used to explore from the back to the front is recorded as an ending boundary, and the beginning boundary and the ending boundary are used to determine a beginning frame and an ending frame of the biometric authentication. Similarly, other boundary detection processing methods are not excluded in the process of boundary detection processing, either.

In some embodiments, length normalization processing may be performed. Three-dimension (3D) interactions between the user and the mobile terminal device via sensors mutually depend on the amplitude and changing speed of the actions of the user with respect to the mobile terminal device. The resulting data sequence collected from a sensor may have changes or variations with inconsistent lengths, leading to discontinuous variations of the 3D scenes or jitter in the data. For example, original sensor data may include variations of data, and the variations may last for different time periods. The lengths of the variations may be referred to as variation lengths. By the normalization processing, the original data with inconsistent variation lengths may be normalized to obtain data with a consistent variation length.

There are many methods for length normalization. If the sensor data has been smoothed, the linear difference method may be adopted in the length normalization processing on the sensor data. As a result, the linear difference may effectively fill up blanks among discontinuous data points, and the complexity of the calculation is low, thereby avoiding a high requirement of the processor performance of the mobile terminal device.

For example, Y value at a position X in the interval $[X_0,X_1]$ is obtained by using the coordinates of starting points of the discontinuous data $(X_0,Y_0)$, $(X_1,Y_1)$ $(X_1,Y_1)$, based on an equation as follows:

$$Y = Y_0 + \frac{(X - X_0)}{(X_1 - X)}(Y_1 - Y_0).$$

The above equation is merely an example and may be modified to some extent.

Furthermore, in addition to the linear difference method, there are many normalization methods. For example, the sensor data in the first direction of X, Y, and Z axes may be used as a normalization standard, and the sensor data in the other two directions may be converted according to the sensor data in the first direction, so as to determine the coordinate points corresponding to the normalized data.

For example, the following equation may be applied: $X=X_0+nD_x$; $Y=Y_0+nD_y$; $Z=Z_0+nD_z$, where, X, Y, Z represent the coordinates a data point, $X_0$, $Y_0$, $Z_0$ represent the coordinates of a starting point of the data, n represents an integer, $D_X$ is a distance on the X axis between two adjacent normalized coordinate points, $D_y$ is a distance on the Y axis between two adjacent normalized coordinate points, and $D_Z$ is a distance on the Z axis between two adjacent normalized coordinate points.

In the embodiments of the specification, by performing data pre-processing on the sensor data to eliminate noises due to shaky hands or inherent to the sensors themselves during sensor data collection, the sensor data with relatively high confidence may then be obtained.

In some embodiments, in addition to performing data pre-processing on the sensor data before entering into an attack determination model for attack determination, historical sensor data may also be pre-processed before being used for training the attack determination model, so as to obtain the sensor data for training (also referred to as sensor training data).

For example, in the step S120, the method may comprise: performing feature extraction on the sensor data to obtain the sensor data with features extracted; and determining whether an attack occurs based on the sensor data with features extracted and the attack determination model; where the attack determination model is trained by using sensor training data with features extracted. For example, feature extraction may be performed on historical sensor data to obtain sensor data with feature extracted for training (also referred to as sensor training data with feature extracted).

In some embodiments, the sensor data before the feature extraction may be the pre-processed sensor data (based on filtering, boundary detection, and/or length normalization) or may be the sensor data of the mobile terminal device when the mobile terminal device performs biometric authentication, which is not limited in the embodiments of the specification.

For example, the sensor data with features extracted comprises the acceleration sensor data of the mobile terminal device and/or the gyroscope data of the mobile terminal device, where, the acceleration sensor data comprises: an average, a standard deviation, a median, a maximum, a minimum, and/or an integral of the measurements of the acceleration sensor of the mobile terminal device in three directions of x, y, and z axes; and the gyroscope data comprises: an average, a standard deviation, a median, a maximum, a minimum, and/or an integral of the measurements of the gyroscope of the mobile terminal device in three directions of x, y, and z axes.

In some embodiments, the integral is used to represent the speed and displacement of the mobile terminal device. In some embodiments, the time length for performing the biometric authentication is also an important parameter of the sensor data. The sensor data serving as an input to the attack determination model may further comprise the time length for performing the biometric authentication.

The data processing methods before the sensor data is input to the attack determination model are listed above. In some embodiments, the above-described pre-processing operation and feature extraction operation are optional.

In some embodiments, before the attack determination model is used to perform determination on the sensor, training based on a large amount of sensor training data may be performed to obtain the attack determination model. The above-described data processing methods may also be applied in the training phase of the attack determination model to perform data processing based on the sensor data to obtain sensor training data for training the attack determination model.

For example, before the step S110, the method may further comprise: obtaining sensor data of the mobile terminal device collected when the mobile terminal device performed biometric authentication historically to obtain multiple sets of sensor training data for the mobile terminal device; and using the multiple sets of sensor training data as inputs to the attack determination model for training to obtain the attack determination model.

As described above, data processing operations, such as pre-processing, feature extraction, and the like, may be performed on the sensor data collected during biometric authentication to obtain the sensor training data.

In some embodiments, supervised binary classification model training or unsupervised binary classification model training may be adopted during the model training.

With regard to the supervised model training, training samples with concept labels (classification) may be learned, so as to predict labels (classifications) of data outside of the training sample set as much as possible. In other words, when the sensor data is input for model training, the input sensor data may be labeled as sensor data with an attack occurring or sensor data without an attack. For example, label (classification) prediction may be performed on an output result corresponding to the input sensor data. Algorithms for supervised training of the model may comprise all regression algorithms and classification algorithms, such as linear regression, decision tree, neural network, K-Nearest Neighbor (KNN), Support Vector Machine (SVM), etc.

Before the step S110, the method may further comprise: obtaining sensor data of the mobile terminal device collected when the mobile terminal device performed biometric authentication historically; determining sensor training data and a corresponding label based on the sensor data and corresponding attack occurrence situation, the label used for indicating whether an attack has occurred to the corresponding sensor training data; and using multiple sets of sensor training data and corresponding labels as inputs to the attack determination model for training to obtain the attack determination model.

In some embodiments, the multiple sets of sensor training data may comprise sensor training data labeled as attack occurring and/or sensor training data labeled as attack not occurring.

There are many training algorithms for supervised training of the model, and different training algorithms have different parameters set for the training of the model. The Random Forest algorithm is taken as an example for describing the functions below. Main parameter settings in the attack determination model may comprise the following: the number of decision trees is 100, the minimum number of leaf nodes is 100, etc. In some embodiments, these parameter settings are adjustable.

With regard to the unsupervised model training, training samples without concept labels (classifications) may be learned, so as to find structural knowledge in the training sample set. In the unsupervised model training, all labels (classifications) are unknown. Algorithms for unsupervised training of the model may comprise all clustering algorithms, such as k-means, Principal Component Analysis (PCA), gaussian mixture model (GMM), etc.

Before the step S110, the method may further comprise: obtaining sensor data of the mobile terminal device collected when the mobile terminal device performed biometric authentication historically; determining sensor training data based on the sensor data; and using multiple sets of sensor training data as inputs to the attack determination model for performing clustering training on the multiple sets of historical sensor data to obtain the attack determination model.

In some embodiments, during the model training, the training may also be performed based on sensor data of different user risk levels and/or different mobile terminal device models to obtain an attack determination model capable of supporting different user risk levels and/or different mobile terminal device models.

For example, the method may further comprise: obtaining a risk level of a user corresponding to the mobile terminal device and/or a model of the mobile terminal device; where the step S120 may be, for example, implemented as follows: determining whether an attack occurs based on the risk level of a user corresponding to the mobile terminal device and/or the model of the mobile terminal device, the sensor data and the attack determination model; where the training of the attack determination model further uses sensor training data corresponding to the risk level of the user of the mobile terminal device and/or the model of the mobile terminal device.

For example, taking the supervised model training as an example, in addition to using the sensor training data as an input feature during the model training, the risk level of the user corresponding to the sensor data may also be used as an input feature, the model of the mobile terminal device corresponding to the sensor data may be used as an input feature, the risk level of the user and the model of the mobile terminal device corresponding to the sensor data may be both used as input features, or the like.

For example, it is assumed that the risk levels of users (also referred to user risk levels) are divided into three types, e.g., low risk, regular risk, and high risk. During the attack model training, the attack determination model may be trained based on sensor training data corresponding to these three risk levels. Accordingly, when attack determination and detection is performed, the sensor training data may be used as input features of the attack determination model, and moreover, the user risk level corresponding to the sensor training data may also be used as an input feature of the attack determination model to determine whether an attack occurs.

The method for training the attack determination model according to sensor training data of mobile terminal devices of different models is similar to the method for training the attack determination model according to the user risk level, which will not be elaborated here.

In some embodiments, the mobile terminal device model and the user risk level may be both used as input features of the attack determination model to train the attack determination model.

The above description is based on the supervised binary classification model that trains the attack determination model according to the model of the mobile terminal device and/or the user risk level. An unsupervised binary classification model may also be adopted to train the attack determination model based on sensor training data of different models of mobile terminal device and/or different user risk levels. Namely, in addition to using the sensor training data as input features, the risk level of the user corresponding to the sensor data may also be used as an input feature, or the model of the mobile terminal device corresponding to the sensor data may also be used as an input feature, alternatively the risk level of the user and the mobile terminal device model corresponding to the sensor data may be both used as input features, or the like.

An example of an attack determination model that supports various user risk levels and/or different models of mobile terminal device is described above. In some embodiments, one attack determination model may correspond to one user risk level and/or one mobile terminal device model.

In some embodiments, during the model training, the training may be performed based on sensor training data of different user risk levels and/or sensor data of different models of mobile terminal device to obtain attack determination models corresponding to different user risk levels and/or different models of mobile terminal device. For example, the training may be performed by using multiple sets of sensor training data of a mobile terminal device model A to obtain an attack determination model corresponding to the mobile terminal device model A, etc.

For example, there are multiple attack determination models, and each attack determination model corresponds to a different mobile terminal device model; where the step S120 may be, for example, implemented as follows: inputting the sensor training data into an attack determination model corresponding to the model of the mobile terminal device to determine whether an attack occurs.

For example, with regard to a mobile terminal device of the model A, training may be performed based on sensor training data corresponding to the mobile terminal device of the model A to obtain an attack determination model corresponding to the mobile terminal device of the model A. With regard to a mobile terminal device of a model B, training may be performed based on sensor training data corresponding to the mobile terminal device of the model B to obtain an attack determination model corresponding to the mobile terminal device of the model B. Accordingly, when attack determination is performed, for the mobile terminal device of the model A, obtained sensor data (or processed sensor data) may be input into the attack determination model corresponding to the mobile terminal device of the model A, so as to obtain an attack determination result; for the mobile terminal device of the model B, obtained sensor data (or processed sensor data) may be input into the attack determination model corresponding to the mobile terminal device of the model B, so as to obtain an attack determination result, and the like.

In some embodiments, an attack determination model has different determination thresholds, and the determination thresholds are set based on risk levels of users corresponding to mobile terminal devices.

For example, the user risk levels may be divided into three types, e.g., low risk, regular risk, and high risk. With regard to users of different risk levels, different determination thresholds may be set for an attack determination model. For example, the determination threshold may be set at 60% for a low risk user; the determination threshold may be set at 50% for a regular risk user; and the determination threshold may be set at 40% for a high risk user. Assuming that the attack occurrence probability of a set of sensor data is determined by the attack determination model to be 45%, if this user's risk level is a low risk level, then the determined attack determination result is that no attack occurs since 45% is lower than the determination threshold of 60% corresponding to the low risk level; if this user's risk level is a regular risk level, then the determined attack determination result is that no attack occurs since 45% is lower than the determination threshold of 50% corresponding to the low risk level; and if this user's risk level is a high risk level, then the determined attack determination result is that an attack occurs since 45% is higher than the determination threshold of 40% corresponding to the low risk level. Therefore, for the same sensor data, the determination results may be different since users have different risk levels.

In some embodiments, an output result of an attack determination model may further be fed back to a system that performs biometric authentication, so as to adjust the process of biometric authentication.

Furthermore, after the step S120, the method may further comprise: adjusting, based on an output result of the attack determination model, a security authentication level of the biometric authentication, where the higher the probability of attack occurrence is indicated by the output result, the higher the security authentication level of the biometric authentication becomes after the adjustment.

Taking face recognition as an example, multiple sets of liveness detection steps may be prepared in a face recognition system based on facial expression and speech interaction for different security authentication levels. If the output risk level of the attack determination model exceeds a first designated threshold, a liveness detection step with a high security authentication level is output to perform authentication on the user to prevent risks. If the output risk level of the attack determination model is lower than a second designated threshold, a liveness detection step with a low security authentication level is output to perform authentication on the user to improve user experience. For example, in combination with Table 1, assuming that the output result of the attack determination model indicates that the risk level of risk occurrence is ultra-high, the security authentication level of the biometric authentication is then adjusted to the highest security authentication level corresponding to the "ultra-high risk," etc.

The embodiments of the specification will be further described below with reference to examples.

Figure 3:
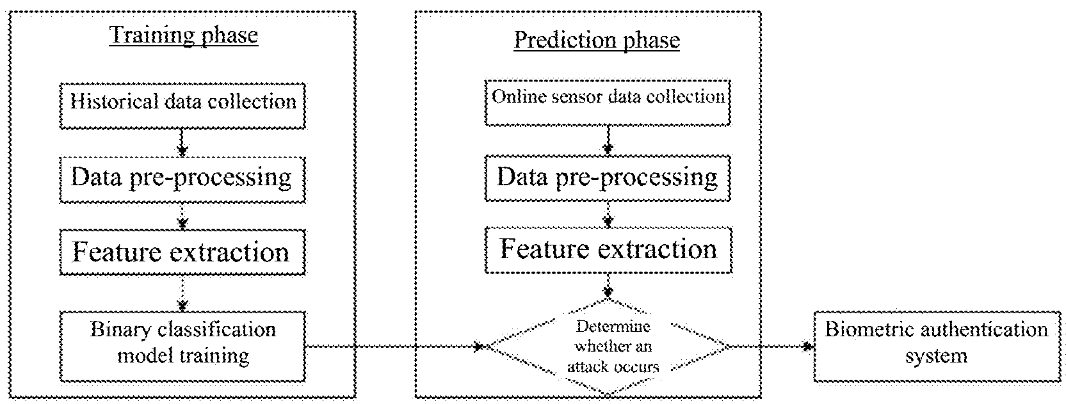
FIG. 3 is a schematic flow chart of training and prediction for biometric authentication according to some embodiments of the specification.

FIG. 3 is a schematic flow chart of training and prediction of biometric authentication according to some embodiments of the specification. A training phase may comprise historical data collection, data pre-processing, feature extraction, and binary classification model training. A prediction phase may comprise online data collection, data pre-processing, feature extraction, determination of whether an attack occurs based on a binary classification model, and the like, as well as output of a determination result to a biometric authentication system. The binary classification model according to some embodiments of the specification is the attack determination model in the embodiment as shown in FIG. 1. For example, the flow chart shown in FIG. 3 may comprise the following.

Historical data collection may be performed. A mobile terminal device collects sensor data obtained in a historical process of biometric authentication. The sensor data may comprise the acceleration sensor data and/or the gyroscope data.

For example, the mobile terminal device may obtain sensor data in the entire process of biometric authentication or in a predetermined time period in the process of biometric authentication. The sensor data may comprise sensor data of one or more dimensions in the 6 dimensions as shown in FIG. 2 and time stamp information corresponding to the sensor data.

Data pre-processing for historical sensor data may be performed. After the collection of the historical sensor data is completed, pre-processing operations, such as filtering operation, boundary detection operation, and length normalization operation, may be further performed on the sensor data, so as to eliminate noises due to shaky hands or inherent to the sensors themselves during collection, thereby obtaining sensor data with relatively high confidence. See relevant description of the embodiments as shown in FIG. 1 for implementations of filtering operation, boundary detection operation, and length normalization operation, which will not be elaborated.

Feature extraction for historical sensor data may be performed. In some embodiments, the feature extraction is performed based on the historical sensor data obtained in the historical data collection or based on the pre-processed sensor data in the data pre-processing for the historical data to obtain sensor data with features extracted.

For example, based on data of an acceleration sensor in three directions of x, y, and z axes in the entire or a predetermined time length in the process of biometric authentication, feature data of the acceleration sensor in three directions of x, y, and z axes, such as an average, a standard deviation, a median, a maximum, a minimum, and an integral, may be obtained. Based on data of a gyroscope in three directions of x, y, and z axes in the entire or a predetermined time length in the process of biometric authentication, feature data of the gyroscope in three directions of x, y, and z axes, such as an average, a standard deviation, a median, a maximum, a minimum, and an integral, may be obtained.

In some embodiments, the feature data such as the time length of performing the biometric authentication may also be determined based on the data obtained by the acceleration sensor or the gyroscope. In some embodiments, the sensor data with features extracted may comprise one or more pieces of the above-described feature data.

Binary classification model training may be performed. During the model training, the sensor data obtained in the historical data collection may be used as training data, the sensor data obtained after the pre-processing in the data pre-processing may be used as training data, or the sensor data obtained after the feature extraction in the feature extraction may be used as training data.

When the sensor data obtained after the feature extraction in the feature extraction is input as training data into the attack determination model, the trained attack determination model may be more accurate.

With regard to the training of the attack determination model, supervised binary classification model training or unsupervised binary classification model training may be adopted, so that two types of application scenarios, e.g., with attack occurrence and without attack occurrence, are identified based on the sensor data. For an example of the training method, the relevant model training methods in the current technologies may be referenced, which will not be elaborated.

Moreover, during the training of the attack determination model, the model of the mobile terminal device and/or the user risk level corresponding to the sensor data may be further used as an input feature of the attack determination model, or different attack determination models may be trained based on different models of mobile terminal device and/or different user risk levels.

Online sensor data collection may be performed. The above description of the historical data collection may be referenced for an example of implementation of the online sensor data collection.

Data pre-processing for online data may be performed. The above description of the data pre-processing for historical sensor data may be referenced for an example of implementation of the Data pre-processing for online sensor data.

Feature extraction for online sensor data may be performed. The above description of the feature extraction for historical sensor data may be referenced for an example of implementation of the feature extraction for online sensor data.

Determination of whether an attack occurs may then be performed based on a binary classification model.

For example, the sensor data obtained after the feature extraction may be used as an input to the binary classification model for determining whether an attack occurs. In some embodiments, the binary classification model may be trained based on collected raw historical sensor data or be trained based on pre-processed historical sensor data, and therefore respective online sensor data (e.g., raw online sensor data, pre-processed online sensor data) may be used as an input to the binary classification model.

Furthermore, if the binary classification model further uses the user risk level and/or the model of the mobile terminal device as an input for training, corresponding information of the user risk level and/or the model of the mobile terminal device also may be input when determination is performed based on the binary classification model.

If multiple binary classification models exist and each binary classification model corresponds to a user risk level and/or a model of mobile terminal device, a binary classification model corresponding to the user risk level and/or the model of mobile terminal device corresponding to the sensor data is selected for determination of the sensor data.

A determination result to may be output to a biometric authentication system. For example, a determination result may be obtained based on the binary classification model. The determination result may be fed back to the biometric authentication system, so that the biometric authentication system executes a corresponding operation.

In some embodiments, the determination result may be fed back to the biometric authentication system, so that the biometric authentication system determines whether an attack occurs, thereby determining whether the current biometric authentication is valid.

In some embodiments, the determination result may be fed back to the biometric authentication system, so that the biometric authentication system determines whether to adjust the security level of the biometric authentication, so as to take both security and user experience into consideration. For example, the determination result may be a risk level of the current biometric authentication, and based on this risk level and the current security level of the biometric authentication, the biometric authentication system may determine whether to adjust the security level of the biometric authentication.

For example, there may be four risk levels in determination results, e.g., low risk, regular risk, high risk, and ultra-high risk, and that corresponding security levels of biometric authentication are divided into Level 1, Level 2, Level 3, and Level 4, respectively (the higher the level is, the higher the authentication requirements are for the biometric authentication, and generally speaking, the poorer the user experience becomes). Assuming that the determination result is a high risk and the security level of biometric authentication is Level 1, then the biometric authentication system may adjust the security level of biometric authentication to correspond to the level of high risk, i.e., Level 3. Assuming that the determination result is low risk and the security level of biometric authentication is Level 4, then the biometric authentication system may adjust the security level of biometric authentication to correspond to the level of low risk, i.e., Level 1, and the like.

Some embodiments of the present specification are described above, and other embodiments fall within the scope of the appended claims. In some situations, actions or steps stated in the claims may be executed in an order different from those in the embodiments and can still achieve desired results. In addition, a process depicted in the accompanying drawings does not necessarily require the illustrated particular order or continuous order to achieve desired results. In some implementations, multi-task processing and parallel processing may be feasible or may be beneficial.

Figure 4:
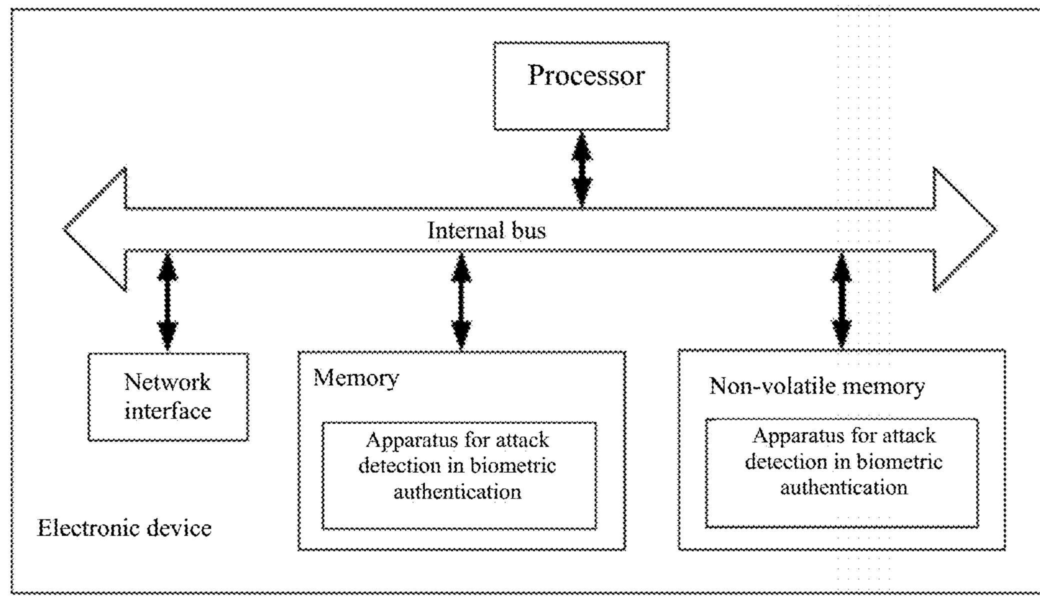
FIG. 4 is a schematic structural diagram of an electronic device for attack detection in biometric authentication according to some embodiments of the specification.

FIG. 4 is a schematic structure diagram of an electronic device for attack detection in biometric authentication according to some embodiments of the specification. Referring to FIG. 4, at a hardware level, the electronic device comprises a processor, and may further comprise an internal bus, a network interface, and a memory, where the memory may comprise an internal memory, such as a Random-Access Memory (RAM), and may further comprise a non-volatile memory, such as at least one disk memory. The electronic device may also comprise hardware required by other business. In some embodiments, the electronic device may be a server, a mobile terminal device, or other devices having the structures described hereinafter and capability to perform the attack detection in biometric authentication.

The processor, the network interface, and the memory may be connected to each other via the internal bus. The internal bus may be an Industry Standard Architecture (ISA) bus, a Peripheral Component Interconnect (PCI) bus, or an Extended Industry Standard Architecture (EISA) bus. The bus may be divided into an address bus, a data bus, a control bus, and the like. For convenience of description, only one two-way arrow is used in FIG. 4 to represent the bus, which does not indicate that there is only one bus or one type of buses.

The memory is used for storing programs. For example, the programs may comprise program codes, and the program codes comprise computer operation instructions. The memory may comprise an internal memory and a non-volatile memory, and may provide instructions and data to the processor.

The processor reads corresponding computer programs from the non-volatile memory into the internal memory, and then executes the computer programs to form an apparatus for attack detection in biometric authentication on the logical level. The processor executes programs stored in the memory and is configured, for example, to execute the following operations: obtaining sensor data of the mobile terminal device when the mobile terminal device performs biometric authentication; and determining whether an attack occurs based on the sensor data and an attack determination model; where the attack determination model is obtained based on training with sensor training data.

The methods implemented by the device for attack detection in biometric authentication disclosed by the embodiments as shown in FIG. 1 of the specification may be applied to a process or may be implemented by the processor. The processor may be an integrated circuit chip with signal processing capabilities. In an implementation process, the steps of the above-described methods may be carried out by an integrated logic circuit of the hardware or instructions in the form of software in the processor. The above-described processor may be a general-purpose processor, including a Central Processing Unit (CPU), a Network Processor (NP), a Digital Signal Processor (DSP), an Application Specific Integrated Circuit (ASIC), a Field-Programmable Gate Array (FPGA), or other programmable logic devices, discrete gates or transistor logic devices, and discrete hardware components, which can implement or execute the methods, steps, and logic block diagrams disclosed in the embodiments of the specification. The general-purpose processor may be a micro-processor, or the processor may also be any conventional processor. Steps of the method disclosed with reference to the embodiments of the specification may be executed and completed by a hardware decoding processor or executed and completed by a combination of hardware and software modules in a decoding processor. The software modules may be disposed in a storage medium mature in the art, such as a random memory, a flash memory, a read-only memory, a programmable read-only memory or an electrically erasable programmable memory, a register and the like. The storage medium is disposed in the memory, and the processor reads information in the memory and completes the steps of the above-described methods in combination with the hardware thereof.

The electronic device may further implement the methods shown in FIG. 1 and achieve functions of the apparatus for attack detection in biometric authentication in the embodiments as shown in FIG. 1, or achieve functions of the training phase and/or the prediction phase in the embodiments as shown in FIG. 2, which will not be elaborated by the embodiments of the specification.

In addition to the software implementation, the electronic device according to the specification does not exclude other implementations, such as logic devices or a combination of software and hardware. In other words, the execution entities of the following processing flow are not limited to various logic units, but may also be hardware or logic devices.

The embodiments of the specification further provide a computer readable storage medium, where the computer readable storage medium stores one or more programs, and the one or more programs comprise instructions which, when executed by a portable electronic device comprising a plurality of applications, can cause the portable electronic device to implement the methods in the embodiments as shown in FIG. 1, and to implement, for example, the following operations: obtaining sensor data of the mobile terminal device when the mobile terminal device performs biometric authentication; and determining whether an attack occurs based on the sensor data and an attack determination model, where the attack determination model is obtained based on training with sensor training data.

Figure 5:
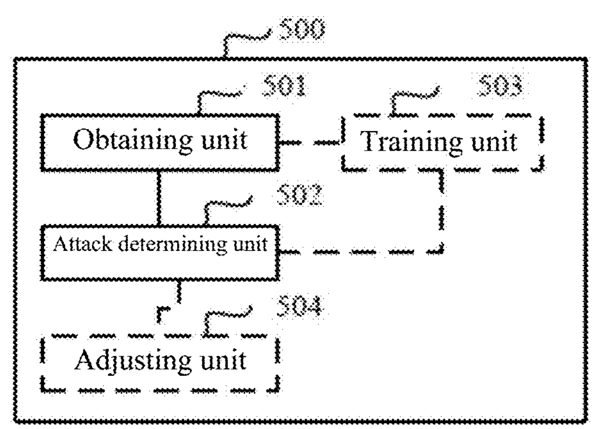
FIG. 5 is a schematic structural diagram of an apparatus for attack detection in biometric authentication according to some embodiments of the specification.

FIG. 5 is a schematic structural diagram of an apparatus 500 for attack detection in biometric authentication according to some embodiments of the specification. Referring to FIG. 5, in a software implementation, the apparatus 500 for attack detection in biometric authentication may comprise: an obtaining unit 501 configured to obtain sensor data of a mobile terminal device when the mobile terminal device performs biometric authentication; and an attack determining unit 502 configured to determine whether an attack occurs based on the sensor data and an attack determination model, where the attack determination model is obtained based on training with sensor training data.

In some embodiments, sensor data collected by a mobile terminal device during biometric authentication is obtained, and attack determination is performed on the sensor data based on a sensor classification model. As a result, with reduced dependence or without dependence on user cooperation, the effect of strengthening the security of biometric authentication can be achieved. The embodiments of the specification provide better security support for users while enhancing user experience.

For example, the obtaining unit 501 is further configured to obtain a risk level of a user corresponding to the mobile terminal device and/or model data of the mobile terminal device; and the attack determining unit 502 is further configured to: determine whether an attack occurs based on the risk level of a user corresponding to the mobile terminal device and/or the model data of the mobile terminal device, the sensor data and the attack determination model, where the training of the attack determination model uses sensor training data under the risk level of a user corresponding to the mobile terminal device and/or a model of the mobile terminal device.

Alternatively, there may be multiple attack determination models, and each attack determination model corresponds to a different mobile terminal device model; and the attack determining unit 502 is configured, for example, to determine whether an attack occurs based on the sensor data and the attack determination model corresponding to the model of the mobile terminal device.

Furthermore, an attack determination model has different determination thresholds, and the determination thresholds may be set based on risk levels of users corresponding to mobile terminal devices. Alternatively, an attack determination model may have different determination thresholds, and the determination thresholds may be set based on models of mobile terminal devices.

The attack determining unit 502 may be configured, for example, to pre-process the sensor data to obtain pre-processed sensor data, where pre-processing the sensor data comprises performing at least one of the following operations on the sensor data: filtering operation, boundary detection operation, and length normalization operation; and determine whether an attack occurs based on the pre-processed sensor data and the attack determination model, where the attack determination model is obtained based on training with the pre-processed sensor training data.

The attack determining unit 502 may be configured, for example, to perform feature extraction on the sensor data to obtain the sensor data with features extracted; and determine whether an attack occurs based on the sensor data with features extracted and the attack determination model, where the attack determination model is obtained based on training with sensor training data with features extracted.

In some embodiments, the sensor data with features extracted comprises acceleration sensor data of the mobile terminal device and/or the gyroscope data of the mobile terminal device; the acceleration sensor data comprises: an average, a standard deviation, a median, a maximum, a minimum, and/or an integral of the measurements of the acceleration sensor of the mobile terminal device in three directions of x, y, and z axes; and the gyroscope data comprises: an average, a standard deviation, a median, a maximum, a minimum, and/or an integral of the measurements of the gyroscope of the mobile terminal device in three directions of x, y, and z axes.

Furthermore, the sensor data with features extracted also comprises a time length of performing the biometric authentication.

In some embodiments, the sensor data subject to feature extraction may be the pre-processed sensor data or may be the sensor data that is not pre-processed.

The apparatus 500 for attack detection in biometric authentication may further comprise a training unit 503, where the training unit 503 may be configured, for example, to obtain sensor data of the mobile terminal device collected when the mobile terminal device performed biometric authentication historically to obtain multiple sets of sensor training data of the mobile terminal device; and use the multiple sets of sensor training data as inputs to the attack determination model for training to obtain the attack determination model.

Further, the training unit 503 may be configured, for example, to obtain sensor data of the mobile terminal device collected when the mobile terminal device performed biometric authentication historically; determine sensor training data and a corresponding label based on the sensor data and corresponding attack occurrence situation, the label used for indicating whether an attack has occurred to the corresponding sensor training data; and use multiple sets of sensor training data and corresponding identifiers as inputs to the attack determination model for training to obtain the attack determination model.

Furthermore, the training unit 503 may be configured, for example, to obtain sensor data of the mobile terminal device collected when the mobile terminal device performed biometric authentication historically; determine sensor training data based on the sensor data; and use multiple sets of sensor training data as inputs to the attack determination model for performing clustering training on the multiple sets of historical sensor data to obtain the attack determination model.

In some embodiments, the apparatus 500 for attack detection in biometric authentication may further comprise an adjusting unit 504, where the adjusting unit 504 may be configured, for example, to adjust, based on an output result of the attack determination model, a security authentication level of the biometric authentication, where the higher the probability of attack occurrence is indicated by the output result, the higher the security authentication level of the biometric authentication becomes after the adjustment.

In summary, the above-described is merely some embodiments of the application, which are not used to limit the scope of the application. Any modification, equivalent substitution, or improvement made within the spirit and principle of the application shall fall within the scope of the application.

The system, device, module, or unit elaborated in the above-described embodiments may be achieved, for example, by a computer chip or entity or by a product having a function. One typical implementation apparatus is a computer. For example, the computer may be a personal computer, a laptop computer, a cellular telephone, a camera phone, a smart phone, a personal digital assistant, a media player, a navigation device, an email device, a game console, a tablet computer, a wearable device, or a combination of any of the above apparatuses.

Computer readable media include non-volatile, volatile, mobile, and immobile media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, magnetic cassettes, magnetic cassette and disk memories or other magnetic storage devices, or any other non-transmission media, which can be used for storing information accessible to a computation device. According to the description in the present specification, the computer readable media do not include transitory media, such as modulated data signals and carriers.

It should be further noted that the terms of "including," "comprising," or any other variants of the terms are intended to encompass a non-exclusive inclusion, causing a process, method, product, or device comprising a series of elements to not only comprise these elements, but also comprise other elements that are not explicitly listed, or further comprise elements that are inherent to the process, method, product, or device. When there is no further restriction, elements described by the statement "comprising one . . . " does not exclude that a process, method, product, or device comprising the above elements further comprises additional identical elements.

The various embodiments in the present specification are described in a progressive manner, the same or similar parts between the various embodiments may refer to each other, and each embodiment focuses on the difference from the other embodiments. In particular, since the system embodiments are substantially similar to the method embodiments, the system embodiments are described in a relatively simple manner, and the description of relevant parts of the method embodiments may be referenced.

What is claimed is:

1. A method for attack detection in biometric authentication, implemented by a mobile terminal device, the method comprising:

obtaining a risk level of a user corresponding to the mobile terminal device;

determining a time length for collecting sensor data of the mobile terminal device based on the obtained risk level of the user, wherein the sensor data of the mobile terminal device comprises movement information of the mobile terminal device, and wherein the time length for collecting sensor data of the mobile terminal device is increased with an increased risk level of the user;

performing the biometric authentication to authenticate the user of the mobile terminal device based on biometric information of the user;

collecting the sensor data of the mobile terminal device for the determined time length, while the mobile terminal device performs the biometric authentication, wherein the sensor data comprises acceleration sensor data of the mobile terminal device indicating accelerations of the mobile terminal device in x, y, and z axes of a three-dimensional space, and/or gyroscope data of the mobile terminal device indicating angular velocities in the x, y, and z axes of the three-dimensional space; and inputting the sensor data and the risk level of the user into an attack determination model to determine whether an attack occurs in the biometric authentication, wherein the attack determination model is trained by using the risk level of the user and sensor training data obtained based on sensor data of the mobile terminal device collected when the mobile terminal device performed biometric authentication historically.

2. The method according to claim 1, wherein the attack determination model includes a determination threshold, and the determination threshold is set based on the risk level of the user corresponding to the mobile terminal device.

3. The method according to claim 1, further comprising:

obtaining information of a model of the mobile terminal device; and wherein inputting the sensor data into an attack determination model to determine whether an attack occurs in the biometric authentication comprises:

inputting the sensor data and the information of the model of the mobile terminal device into the attack determination model to determine whether an attack occurs in the biometric authentication, wherein the attack determination model is trained by using sensor training data corresponding to the model of the mobile terminal device.

4. The method according to claim 1, wherein before inputting the sensor data into an attack determination model to determine whether an attack occurs in the biometric authentication, the method further comprises:

pre-processing the sensor data by performing at least one of the following operations on the sensor data: filtering operation, boundary detection operation, or length normalization operation, to obtain pre-processed sensor data; and wherein inputting the sensor data into an attack determination model to determine whether an attack occurs in the biometric authentication comprises:

inputting the pre-processed sensor data into the attack determination model to determine whether an attack occurs in the biometric authentication, wherein the attack determination model is trained by using pre-processed sensor training data which is obtained by pre-processing the sensor training data.

5. The method according to claim 1, wherein before inputting the sensor data into an attack determination model to determine whether an attack occurs in the biometric authentication, the method further comprises:

performing feature extraction on the sensor data to obtain the sensor data with features extracted; and wherein inputting the sensor data into an attack determination model to determine whether an attack occurs in the biometric authentication comprises:

inputting the sensor data with features extracted into the attack determination model to determine whether an attack occurs in the biometric authentication, wherein the attack determination model is trained by using sensor training data with features extracted which is obtained by performing feature extraction on the sensor training data.

6. The method according to claim 5, wherein the acceleration sensor data of the mobile terminal device is measured by an acceleration sensor of the mobile terminal device, and the gyroscope data is measured by a gyroscope of the mobile terminal device; and wherein the sensor data with features extracted comprises:

an average, a standard deviation, a median, a maximum, a minimum, and/or an integral of measurements of the acceleration sensor of the mobile terminal device in the x, y, and z axes of the three-dimensional space; and/or an average, a standard deviation, a median, a maximum, a minimum, and/or an integral of measurements of the gyroscope of the mobile terminal device in the x, y, and z axes of the three- dimensional space.

7. The method according to claim 5, wherein the sensor data with features extracted also comprises a time length of performing the biometric authentication.

8. The method according to claim 1, further comprising:
adjusting a security authentication level of the biometric authentication based on an output result of the attack determination model, wherein the higher a probability of attack occurrence is indicated by the output result, the higher the security authentication level of the biometric authentication becomes after the adjustment.

9. An apparatus for attack detection in biometric authentication, comprising one or more processors and one or more non-transitory computer-readable memories coupled to the one or more processors and configured with instructions executable by the one or more processors to cause the apparatus to perform operations comprising:
obtaining a risk level of a user corresponding to a mobile terminal device;
determining a time length for collecting sensor data of the mobile terminal device based on the obtained risk level of the user, wherein the sensor data of the mobile terminal device comprises movement information of the mobile terminal device, and wherein the time length for collecting sensor data of the mobile terminal device is increased with an increased risk level of the user;
performing the biometric authentication to authenticate the user of the mobile terminal device based on biometric information of the user;
collecting the sensor data of the mobile terminal device for the determined time length while the mobile terminal device performs the biometric authentication, wherein the sensor data comprises acceleration sensor data of the mobile terminal device indicating accelerations of the mobile terminal device in x, y, and z axes of a three-dimensional space, and/or gyroscope data of the mobile terminal device indicating angular velocities in the x, y, and z axes of the three-dimensional space; and
inputting the sensor data and the risk level of the user into an attack determination model to determine whether an attack occurs in the biometric authentication, wherein the attack determination model is trained by using the risk level of the user and sensor training data obtained based on sensor data of the mobile terminal device collected when the mobile terminal device performed biometric authentication historically.

10. The apparatus according to claim 9, wherein the attack determination model includes a determination threshold, and the determination threshold is set based on the risk level of the user corresponding to the mobile terminal device.

11. The apparatus according to claim 9, wherein the operations further comprise: obtaining information of a model of the mobile terminal device; and
wherein inputting the sensor data into an attack determination model to determine whether an attack occurs in the biometric authentication comprises:
inputting the sensor data and the information of the model of the mobile terminal device into the attack determination model to determine whether an attack occurs in the biometric authentication, wherein the attack determination model is trained by using sensor training data corresponding to the model of the mobile terminal device.

12. The apparatus according to claim 9, wherein before inputting the sensor data into an attack determination model to determine whether an attack occurs in the biometric authentication, the operations further comprise:
pre-processing the sensor data by performing at least one of the following operations on the sensor data: filtering operation, boundary detection operation, or length normalization operation, to obtain pre-processed sensor data; and
wherein inputting the sensor data into an attack determination model to determine whether an attack occurs in the biometric authentication comprises:
inputting the pre-processed sensor data into the attack determination model to determine whether an attack occurs in the biometric authentication, wherein the attack determination model is trained by using pre-processed sensor training data which is obtained by pre-processing the sensor training data.

13. The apparatus according to claim 9, wherein before inputting the sensor data into an attack determination model to determine whether an attack occurs in the biometric authentication, the operations further comprise:
performing feature extraction on the sensor data to obtain the sensor data with features extracted; and
wherein inputting the sensor data into an attack determination model to determine whether an attack occurs in the biometric authentication comprises:
inputting the sensor data with features extracted into the attack determination model to determine whether an attack occurs in the biometric authentication, wherein the attack determination model is trained by using sensor training data with features extracted which is obtained by performing feature extraction on the sensor training data.

14. The apparatus according to claim 13, wherein the acceleration sensor data of the mobile terminal device is measured by an acceleration sensor of the mobile terminal device, and the gyroscope data is measured by a gyroscope of the mobile terminal device; and
wherein the sensor data with features extracted comprises:
an average, a standard deviation, a median, a maximum, a minimum, and/or an integral of measurements of the acceleration sensor of the mobile terminal device in the x, y, and z axes of the three-dimensional space; and/or
an average, a standard deviation, a median, a maximum, a minimum, and/or an integral of measurements of the gyroscope of the mobile terminal device in the x, y, and z axes of the three- dimensional space.

15. The apparatus according to claim 13, wherein the sensor data with features extracted also comprises a time length of performing the biometric authentication.

16. The apparatus according to claim 9, wherein the operations further comprise:
adjusting a security authentication level of the biometric authentication based on an output result of the attack determination model, wherein the higher a probability of attack occurrence is indicated by the output result, the higher the security authentication level of the biometric authentication becomes after the adjustment.

17. A non-transitory computer-readable storage medium configured with instructions executable by one or more processors to cause the one or more processors to perform operations comprising:
obtaining a risk level of a user corresponding to a mobile terminal device;
determining a time length for collecting sensor data of the mobile terminal device based on the obtained risk level of the user, wherein the sensor data of the mobile terminal device comprises movement information of the mobile terminal device, and wherein the time length for collecting sensor data of the mobile terminal device is increased with an increased risk level of the user;

performing the biometric authentication to authenticate the user of the mobile terminal device based on biometric information of the user;

collecting the sensor data of the mobile terminal device for the determined time length while the mobile terminal device performs the biometric authentication, wherein the sensor data comprises acceleration sensor data of the mobile terminal device indicating accelerations of the mobile terminal device in x, y, and z axes of a three-dimensional space, and/or gyroscope data of the mobile terminal device indicating angular velocities in the x, y, and z axes of the three-dimensional space; and inputting the sensor data and the risk level of the user into an attack determination model to determine whether an attack occurs in the biometric authentication, wherein the attack determination model is trained by using the risk level of the user and sensor training data obtained based on sensor data of the mobile terminal device collected when the mobile terminal device performed biometric authentication historically.

18. The non-transitory computer-readable storage medium according to claim 17, wherein the attack determination model includes a determination threshold, and the determination threshold is set based on the risk level of the user corresponding to the mobile terminal device.

19. The non-transitory computer-readable storage medium according to claim 17, wherein the operations further comprise: obtaining information of a model of the mobile terminal device; and wherein inputting the sensor data into an attack determination model to determine whether an attack occurs in the biometric authentication comprises:

inputting the sensor data and the information of the model of the mobile terminal device into the attack determination model to determine whether an attack occurs in the biometric authentication, wherein the attack determination model is trained by using sensor training data corresponding to the model of the mobile terminal device.

20. The non-transitory computer-readable storage medium according to claim 17, wherein before inputting the sensor data into an attack determination model to determine whether an attack occurs in the biometric authentication, the operations further comprise:

pre-processing the sensor data by performing at least one of the following operations on the sensor data: filtering operation, boundary detection operation, or length normalization operation, to obtain pre-processed sensor data; and wherein inputting the sensor data into an attack determination model to determine whether an attack occurs in the biometric authentication comprises:

inputting the pre-processed sensor data into the attack determination model to determine whether an attack occurs in the biometric authentication, wherein the attack determination model is trained by using pre-processed sensor training data which is obtained by pre-processing the sensor training data.

* * * * *

UNITED STATES PATENT AND TRADEMARK OFFICE

CERTIFICATE OF CORRECTION

PATENT NO. : 11,288,348 B2
APPLICATION NO. : 16/812163
DATED : March 29, 2022
INVENTOR(S) : Xinyi Fu et al.

It is certified that error appears in the above-identified patent and that said Letters Patent is hereby corrected as shown below:

In the Claims

Claim 1, Column 19, Line 42:
“time length for collecting sensor data” should read -- time length for collecting the sensor data --.

Claim 1, Column 19, Lines 66-67:
“sensor training data obtained based on sensor data” should read -- sensor training data obtained based on historical sensor data --.

Claim 9, Column 21, Line 19:
“time length for collecting sensor data” should read -- time length for collecting the sensor data --.

Claim 9, Column 21, Lines 43-44:
“sensor training data obtained based on sensor data” should read -- sensor training data obtained based on historical sensor data --.

Claim 17, Column 22, Line 63:
“time length for collecting sensor data” should read -- time length for collecting the sensor data --.

Claim 17, Column 23, Lines 19-20:
“sensor training data obtained based on sensor data” should read -- sensor training data obtained based on historical sensor data --.

Signed and Sealed this
Twenty-eighth Day of June, 2022

Katherine Kelly Vidal

Katherine Kelly Vidal
*Director of the United States Patent and Trademark Office*